Dec. 28, 1948.　　　　R. A. PRESS　　　　2,457,490
REEL FOR GRAIN HARVESTERS

Filed July 5, 1944　　　　　　　　　　　　　3 Sheets-Sheet 1

Inventor
RAY A. PRESS,

By Clarence A. O'Brien
and Harvey B. Jacobson
Attorneys

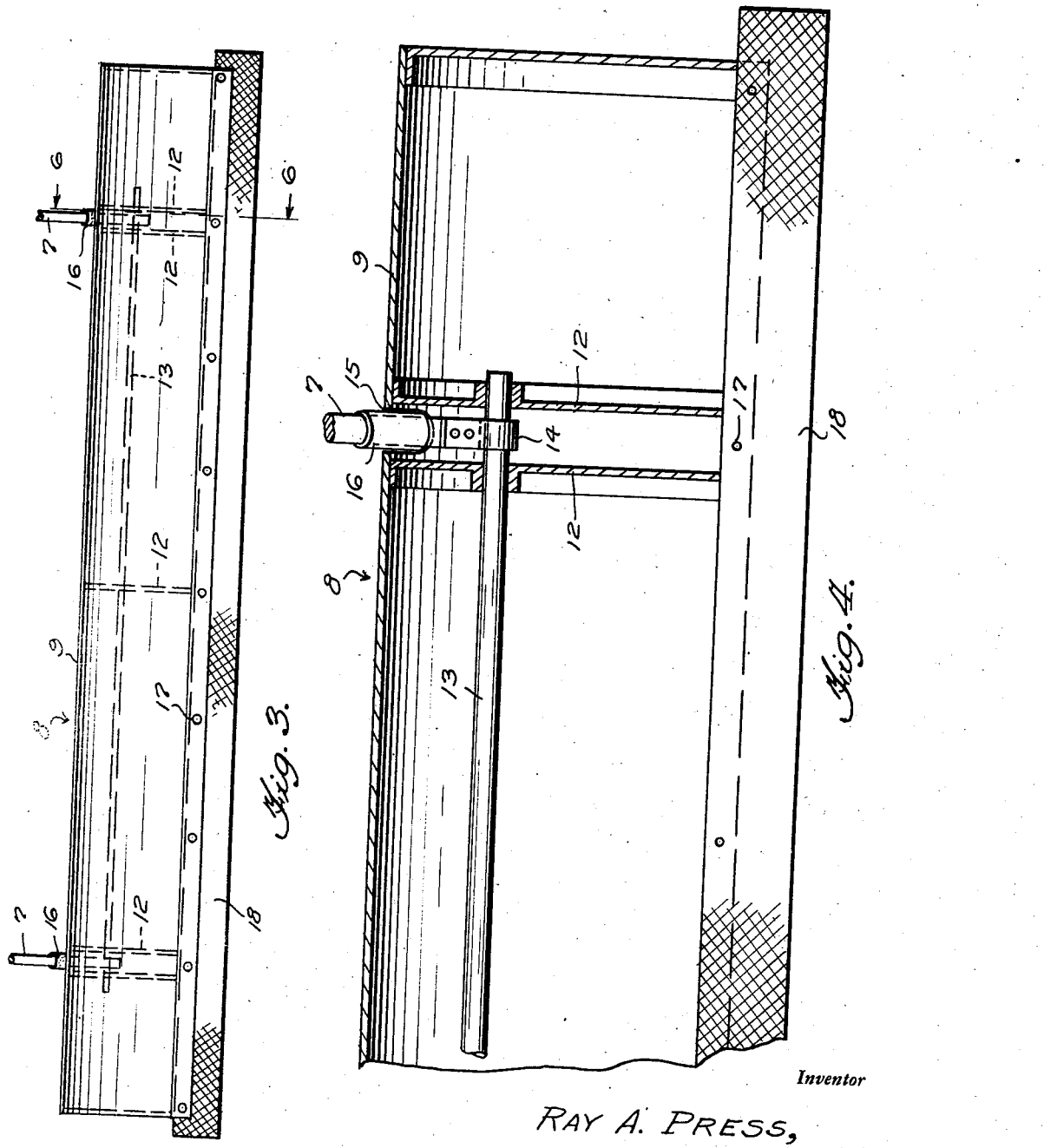

Dec. 28, 1948.   R. A. PRESS   2,457,490
REEL FOR GRAIN HARVESTERS
Filed July 5, 1944
3 Sheets-Sheet 3
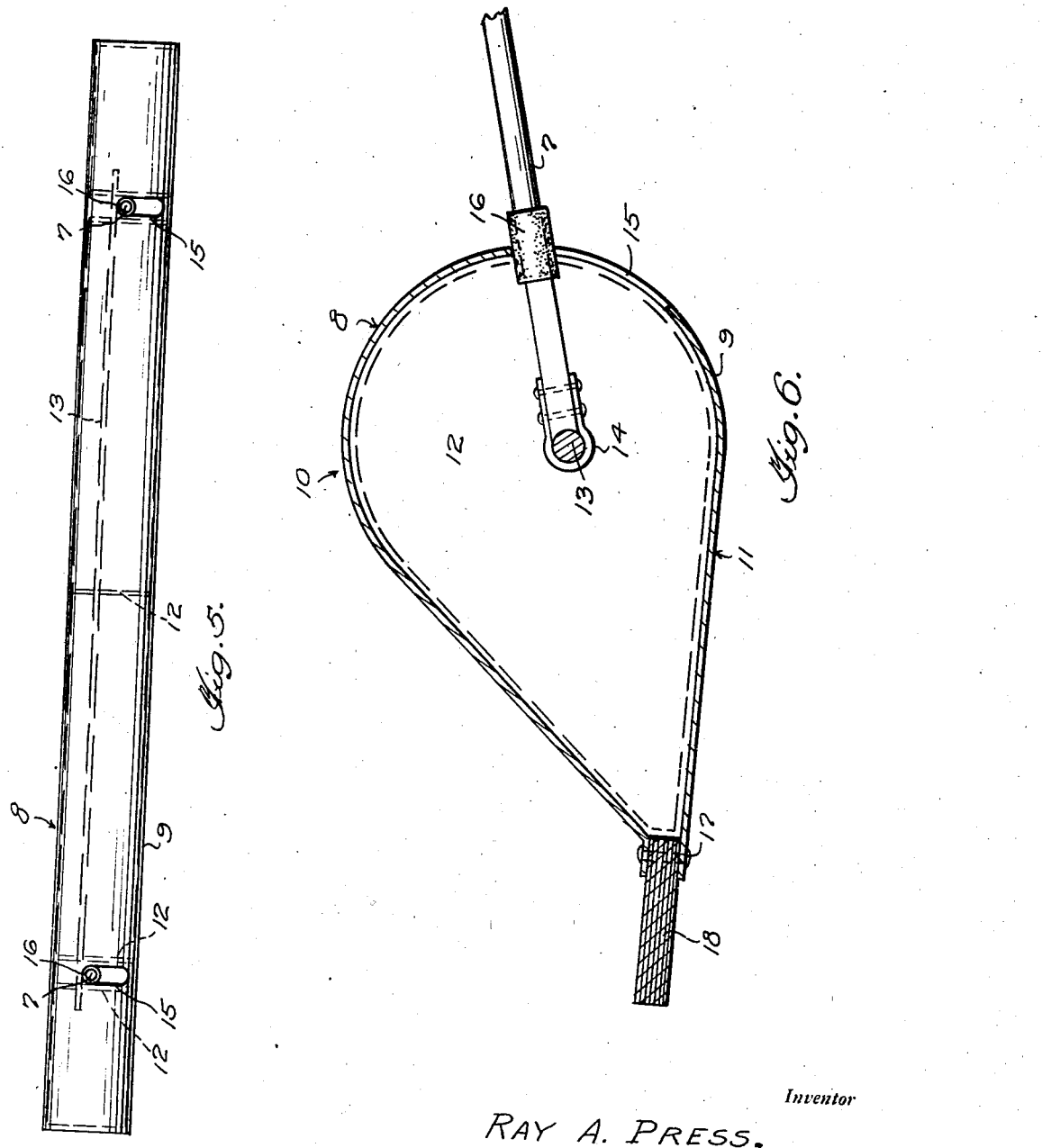
Inventor
RAY A. PRESS,
By Clarence A. O'Brien
and Harvey B. Jacobson
Attorneys Patented Dec. 28, 1948

2,457,490

UNITED STATES PATENT OFFICE 2,457,490

REEL FOR GRAIN HARVESTERS

Ray A. Press, Lancaster, Calif.

Application July 5, 1944, Serial No. 543,558

4 Claims. (Cl. 56—220)

This invention relates to an improved reel for grain harvesters, such as binders, combines, and the like.

The primary object of the invention is to provide a reel of the above kind having paddles of novel form substituted for the usual cross slats, and whereby the reel will pick up grain that is standing irregularly resultant from clogging and lodging of the grain, and whereby the reel will cooperate with the guard of the cutting mechanism of the harvester to bend the grain over or back and down so as to sweep the grain onto the platform with less grain being shelled and wasted than when the grain is struck by ordinary reel slats.

A more specific object of the invention is to provide a reel of the above kind having paddles of such novel and improved construction as to avoid damage to wheat grains, wheat straw or the like when being cut and gathered by a harvester, and which insures a saving of such grain during the working of the harvester.

A more specific object of the invention is the provision of a reel of the above kind which is simple in construction, thoroughly reliable and efficient in operation, and inexpensive to manufacture and install.

The exact nature of the present invention will become apparent from the following description when considered in connection with the accompanying drawings, and the invention consists in the novel form, combination and arrangement of parts hereinafter more fully described, shown in the drawings and claims.

In the drawings, wherein like reference characters indicate corresponding parts throughout the several views—

Figure 3 is a fragmentary rear elevational view of one of the paddles of the reel shown in Figure 1, together with adjacent portions of the reel arms.

Figure 4 is an enlarged fragmentary longitudinal sectional view taken through one of the paddles substantially on the line 4—4 of Figure 2.

Figure 5 is a section taken substantially on line 5—5 of Figure 1.

Figure 6 is an enlarged section taken substantially on line 6—6 of Figure 3.

Figure 1:
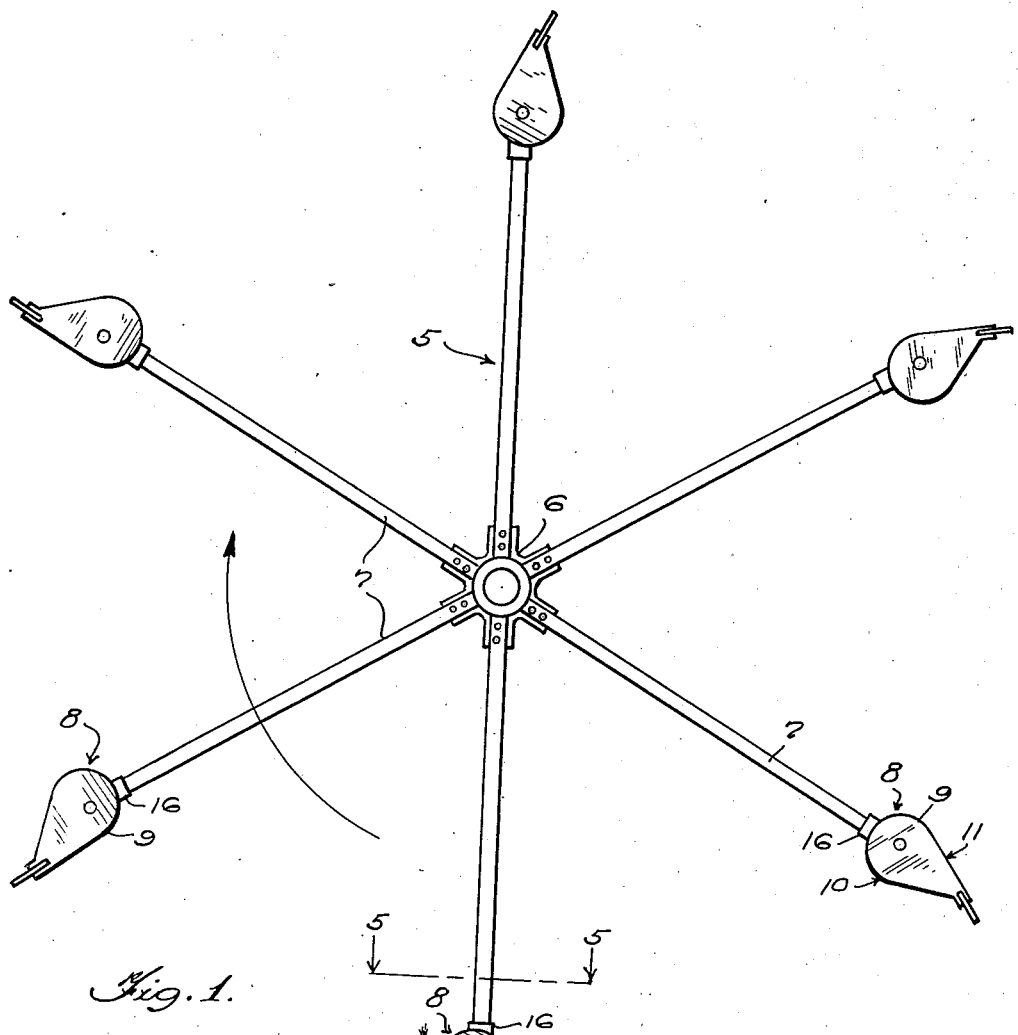
Figure 1 is a side elevational view of a reel of a grain harvester having paddles constructed in accordance with the present invention.
Figure 2:
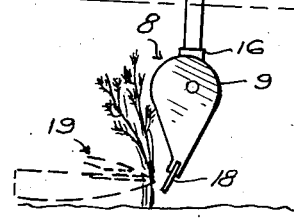
Figure 2 is an enlarged fragmentary side elevational view, more clearly showing one of the paddles in end elevation.

Referring in detail to the drawings, 5 designates generally a reel of a grain binder, combine, or the like, and as usual it includes a hub 6 having radially disposed arms 7 which carry at their outer ends, in lieu of the usual cross slats, paddles 8 constructed in accordance with the present invention.

As shown, each paddle 8 consists of an elongated hollow member of somewhat bulbous form in cross section, as indicated at 9, and preferably comprising a longitudinally folded elongated sheet of metal having a convex bulged leading side 10, and a flat trailing side 11. The paddle further includes a series of longitudinally spaced transverse plates 12 about which the member 9 is shaped when folded or returned bent. As shown in Figure 4 and indicated by dotted lines in Figure 3, a pair of the plates 12 are arranged in adjacent spaced relation near the ends of the member 9, and mounted in the plates 12 longitudinally of the member 9 and adjacent its inner broad portion is a shaft 13 on which the outer ends of the reel arms 7 are pivoted, as at 14. The broad inner portions of the members 9 are provided with arcuate transverse slots at 15 through which the reel arms 7 freely extend so that the paddles are capable of limited swinging movement relative to the arms 7 about axes parallel with the axis of the reel. Fitted and suitably secured on the portions of the arms 7 that are movable in the slots 15 are resilient sleeves 16 of rubber or the like which cushion the shock between the arms 7 and the member 9 as the paddles swing to their limits of movement. By employing sleeves 16 whose walls are of different thicknesses, the degree of swinging movement of the paddle may be changed to a limited extent. Secured by riveting or the like, as at 17, between the free edge portions of the member 9 and projecting outwardly therefrom are flexible resilient strips 18 that form yieldable blades and are preferably made of rubber as well as preferably extending slightly beyond the ends of the member 9. Due to the swinging movement of the paddles and the yieldable nature of the blades formed by the strips 18, the blades descend upon the grain substantially edgewise and effect a light striking or slapping action upon the grain toward the platform of the harvester as the grain is cut by the sickle or cutting mechanism, without freeing the kernels from the shells. Due to the bulged or pronounced convex form of the leading sides of the paddle members 9, the grain is bent over or back and down upon the platform of the harvester from the tops of the grain to the cutter guards of the cutting mechanism or sickle, thereby sweeping the grain onto the platform with less grain being shelled or wasted than occurs when the grain is struck by ordinary reel slats.

The paddles are of simple, durable, and efficient construction, and they can be readily and cheaply manufactured as well as readily applied to the arms of existing or new reels in a convenient and expeditious manner by the mere use of hinge straps at 14 on the ends of the reel arms after application of the shock-absorbing sleeves 16 to said reel arms. The bending action of the blades formed by the strips 18 is generally illustrated at the bottom of Figure 1 wherein the grain is shown being bent over or backwardly and downwardly by the convex side of the paddle member 9 prior to cutting of the grain by the cutting mechanism of the harvester, indicated at 19. The flexible blades formed by the strips 18 then follow through with a wiping action across the sickle guards so as to effectively deliver the cut grain rearwardly onto the harvester platform with a gentle action that results in a minimum waste of grain.

From the foregoing description, it is believed that the construction and operation, as well as the advantages of the present invention, will be readily understood and appreciated by those skilled in the art. Minor changes in details of construction illustrated and described are contemplated, such as fall within the spirit and scope of the invention as claimed.

What I claim is:

1. A harvester reel comprising, in combination with the usual hub and its radially disposed arms, of paddles pivotally mounted on the outer ends of said arms for limited swinging movement about axes parallel with the axis of the reel and so as to descend upon the grain substantially edgewise, said paddles having resilient yieldable blades projecting at the outer portions thereof, each paddle comprising a hollow elongated member of substantially bulbous form in cross section with slots in its broader inner portion through which the associated arms freely extend said arms being pivoted to the paddles within said hollow members thereof adjacent the inner broader portions of the same.

2. The construction defined in claim 1 wherein each hollow paddle member comprises a return bent sheet of metal having transverse partition plates therein arranged in adjacent pairs near opposite ends of the paddle, the arms of the reel being pivoted to the blades between the pairs of said plates thereof.

3. The construction defined in claim 1, wherein each hollow paddle member comprises a return bent sheet of metal having transverse partition plates therein arranged in adjacent pairs near opposite ends of the paddle, the arms of the reel being pivoted to the blades between the pairs of said plates thereof, the resilient flexible blades of the paddles comprising strips of flexible resilient material secured between the free outer edge portions of said return bent sheets.

4. The construction defined in claim 1, in combination with rubber shock absorbing sleeves mounted on the arms at points within the slots of the paddles.

RAY A. PRESS.

REFERENCES CITED

The following references are of record in the file of this patent:

UNITED STATES PATENTS

| Number | Name | Date |
|---|---|---|
| 515,802 | Storey | Mar. 6, 1894 |
| 758,241 | Friend et al. | Apr. 26, 1904 |
| 769,471 | Eyster | Sept. 6, 1904 |
| 1,331,304 | Wilkens | Feb. 17, 1920 |
| 1,337,193 | Calvert | Apr. 20, 1920 |
| 1,770,077 | Kunz | July 8, 1930 |
| 1,996,294 | Hume et al. | Apr. 2, 1935 |
| 2,152,920 | Ristau | Apr. 4, 1939 |